United States Patent [19]

Ferland

[11] 4,284,422
[45] Aug. 18, 1981

[54] INDUSTRIAL VACUUM CLEANER

[76] Inventor: Omer Ferland, C.P.138, Village Sakami, Nouveau Québec Baie James, Canada, J0Y 3A0

[21] Appl. No.: 158,016

[22] Filed: Jun. 9, 1980

[30] Foreign Application Priority Data

Jun. 12, 1979 [CA] Canada .................................. 329557

[51] Int. Cl.³ ............................................ B01D 46/04
[52] U.S. Cl. ....................................... 55/300; 55/321; 55/334; 55/417; 55/429; 55/404; 55/432; 55/442; 55/468; 55/304; 175/66; 175/206
[58] Field of Search ...................... 55/96, 97, 300, 112, 55/304, 305, 321, 324, 442, 325, 328, 331–337, 404, 405, 468, 417, 429, 432; 175/206, 66

[56] References Cited

U.S. PATENT DOCUMENTS

| 851,254 | 4/1907 | Rothenbucher | 55/405 |
| 935,066 | 9/1909 | Szesny | 55/405 |
| 2,781,104 | 2/1957 | Fischer | 55/304 |
| 3,895,929 | 7/1975 | Jysky et al. | 55/305 |
| 3,910,360 | 10/1975 | Sundstrom | 55/96 |

FOREIGN PATENT DOCUMENTS 880779 6/1953 Fed. Rep. of Germany ............. 55/305

Primary Examiner—Bernard Nozick

[57] ABSTRACT

An industrial vacuum cleaner is disclosed. The vacuum cleaner comprises a housing having an inlet port, means for creating a vacuum in the housing to suck dust into the housing, means located in the housing adjacent such inlet port for separating any liquid or snow which may be drawn up with the dust, and a filter, also located in the housing, for collecting the dust.

4 Claims, 6 Drawing Figures

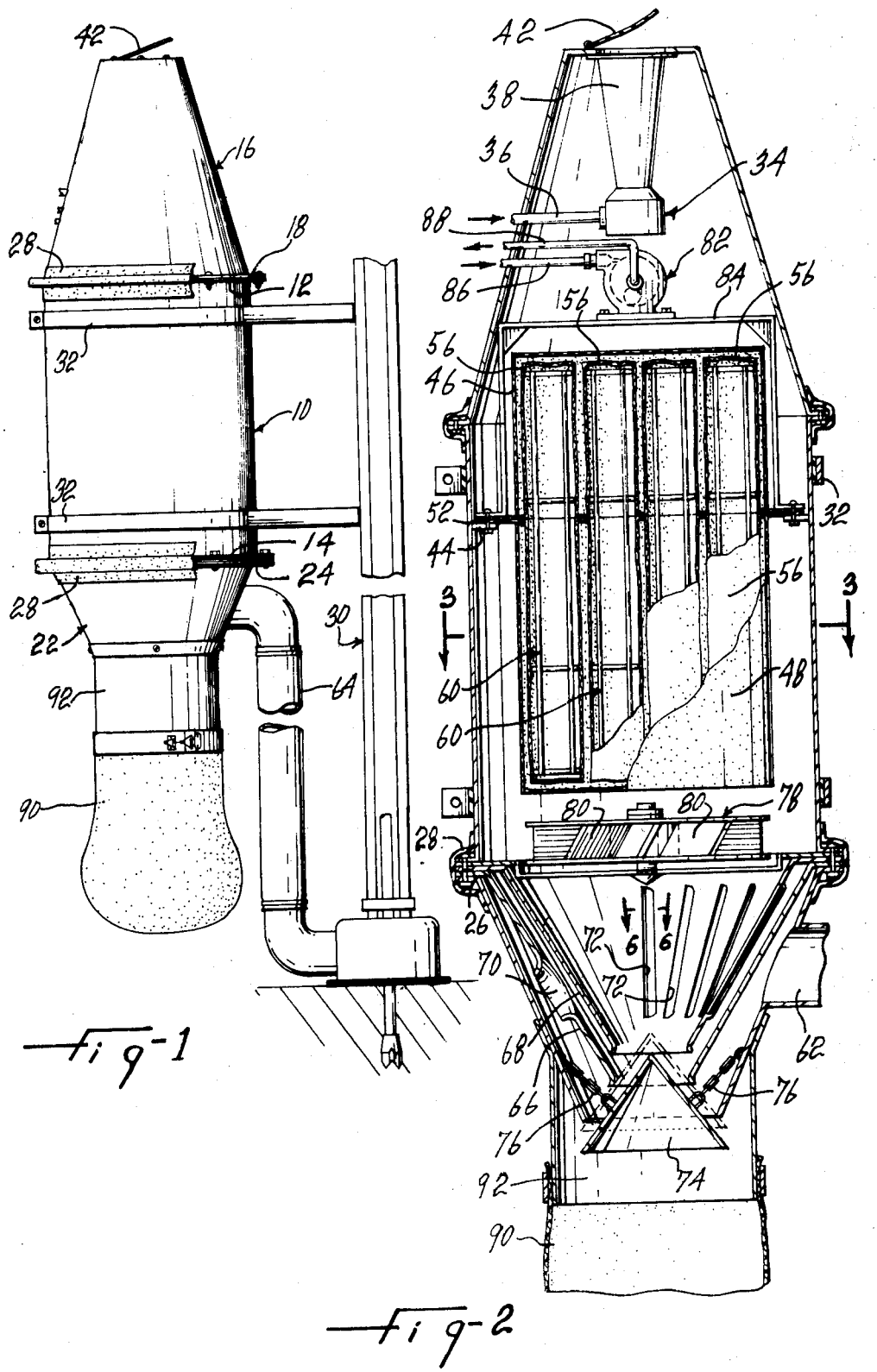

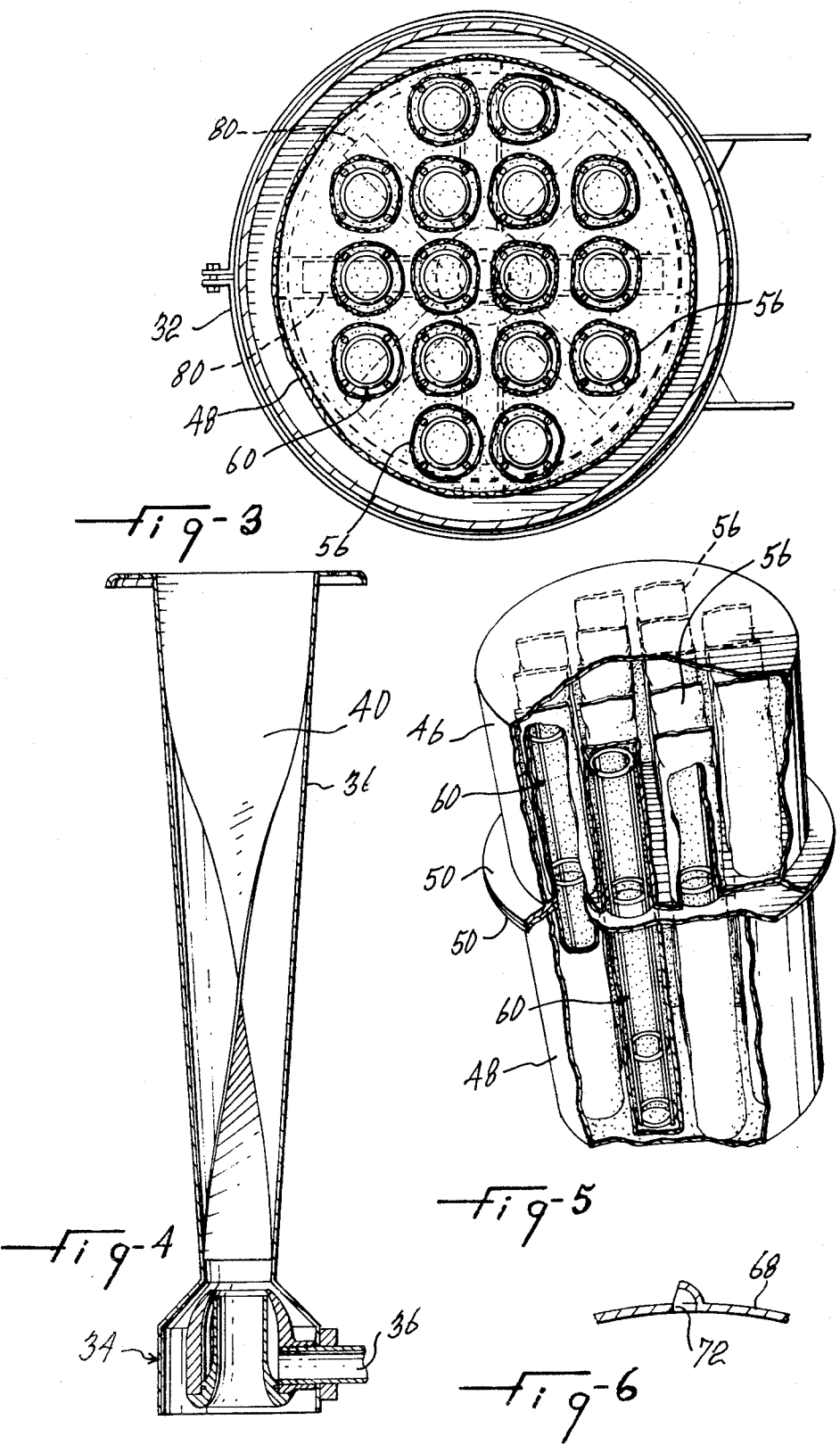

INDUSTRIAL VACUUM CLEANER

This invention relates to an industrial vacuum cleaner for collecting dust generated by industrial equipment, more particularly by rock drilling and crushing equipment.

In recent years, an effort has been made by the industry in general to maintain a cleaner environment due to the more and more stringent governmental regulations concerning the workers' working conditions and pollution in general. This was particularly the case of quarries where, for a number of years, workers operating rock drilling and crushing equipment have been exposed to relatively high level of dust which has caused breathing illnesses, when not worse, to many of them.

Industrial machines capable of collecting dust have been put on the market but, unfortunately, they have been generally costly and relatively inefficient. The known machines are big and heavy and, as they are normally operated by the same compressor as the rock drilling and crushing equipment, they draw a lot of power from the compressor, which reduces by that much the power available for the rock drilling and crushing equipment, thereby lowering the output of such equipment. Furthermore, the known dust-collecting machines are not generally built for working in a wet environment and any small amount of water or snow mixed with dust is sufficient to completely block the filters. When this happens, the filters have to be replaced, which is a costly and time-consuming operation due to the enormous size. It will be understood that this happens fairly often because, even in a hot summer day, water infiltrated between cracks in the rock is often encountered. In winter, snow is often sucked with the dust.

It is therefore the object of the present invention to provide an industrial vacuum cleaner which can separate water or snow from dust, thus preventing wetting the filter, and which, in addition, has a much greater filter surface per unit volume, thus greatly reducing the size of the apparatus.

The apparatus, in accordance with the invention, comprises a housing having an inlet port, means for creating a vacuum in the housing to suck dust into the housing, means located in the housing adjacent the inlet port for separating any water or snow which may be drawn up with the dust, and a filter, also located in the housing, for collecting the dust.

In a perferred embodiment of the invention, the housing comprises a main cylindrical body, which is mounted vertically on a supporting structure and two frusto-conical bodies secured one to each end of the main body. The means for creating a vacuum in the housing is preferably a venturi pump mounted in the upper frusto-conical body of the housing. The filter is preferably mounted in the main body of the housing and comprises a cylindrical portion of porous material closed at the top and open at its lower end, and having a diameter slightly smaller than the diameter of the main body of the housing, and a plurality of tubes of porous material, of smaller diameter, mounted within the cylindrical portion of the filter and also open at their lower end.

The means for separating water and snow from the dust preferably comprises a plurality of frusto-conical concentric tubes arranged to form baffles for collecting water and snow, but allowing dust to pass to the filter assembly. The lower end of the frusto-conical body is preferably closed with a conical plug, which is suspended from the body but adapted to close the lower end of the frusto-conical body under the vacuum created in the housing during operation of the vacuum cleaner. The conical plug is suspended from the frusto-conical body by means of chains when vacuum is removed.

Means are preferably provided for attaching a dust-collecting bag to the lower end of the frusto-conical body of the housing and a vibrator is mounted on the filter for causing the dust collected on such filter to fall through the water-collecting tubes and into the dust-collecting bag, when the vibrator is operated.

The invention will now be disclosed, by way of example, with reference to the accompanying drawings, in which:

FIG. 1 illustrates a side view of the industrial vacuum cleaner in accordance with the invention;

FIG. 2 illustrates a longitudinal section view through the vacuum cleaner of FIG. 1;

FIG. 3 illustrates a longitudinal view through the venturi pump shown in FIG. 2;

FIG. 4 illustrates a section view through line 4—4 of FIG. 2;

FIG. 5 illustrates a perspective view of the filter assembly shown in FIG. 2; and FIG. 6 illustrates a plan view of one of the dust-collecting elements shown in FIG. 2.

Referring to FIGS. 1 and 2 of the drawings, there is shown the housing of an industrial vacuum cleaner comprising a main cylindrical body 10 provided with end flanges 12 and 14, an upper frusto-conical body 16 provided with a flange 18 and secured to the main body by bolts, and a lower frusto-conical body 22, also provided with a flange 24, and secured to the main body by bolts 26. The flanges are covered by a plastic jacket 28. The housing is secured to the mast 30 of the rock drilling equipment by means of straps 32.

Mounted within the frusto-conical body 16, is a venturi type pump 34 capable of creating a vacuum in the housing sufficient to suck dust from the drilling equipment into the housing. The pump is fed with compressed air through inlet tube 36 and such air flows out through flaring duct 38. As shown in FIG. 4, a twisted blade 40 is positioned in duct 38 to create a vortex which increases the efficiency of the venturi pump. The outlet of the pump is closed by a rubber flap 42, which opens under pressure but closes under gravity when the venturi pump is not working to prevent rain from penetrating inside the housing.

The main body 10 of the housing is also provided with an integral flange 44 to which is secured a filter assembly, of cylindrical configuration, made of two sections 46 and 48 of porous material, each having a flange 50 which is secured to the flange 44 by means of bolts 52. Of course, other means of attaching the filter assembly to the inside of the housing are also envisaged. The filter section 46 is closed at the top but the bottom thereof is provided with a plurality of openings, into which are inserted a plurality of filter tubes 56, also made of porous material. The top of the filter section 48 is also provided with a plurality of openings registering with the opening 54 in the top filter section. The bottom of the filter section 48 and of the filter tubes 56 is open. The filter tubes are maintained in inflated form by means of supports 60 inserted inside the tubes and made of metal or plastic. The porous material of the filter sections 46 and 48 and of the filter tubes 56 can be made of felt or other suitable porous material.

Further, lower frusto-conical body 22 has an inlet port 62 for receiving the dust drawn up from the drilling equipment through pipe 64. Two frusto-conical tubes 66 and 68 are concentrically mounted inside the frusto-conical body 22 for separating water or snow entering into the housing from the dust. Tube 66 has an opening 70 diametrically opposed to the opening 62 in the frusto-conical body 22, so as to permit most of the water and snow to fall to the bottom of the housing by gravity. Tube 68 has a series of longitudinal baffled openings 72 extending around its outside diameter, except for the area adjacent opening 70 to let the dust pass to the filter but allow water and snow to fall towards the bottom of the housing. The lower end of the frusto-conical tube 22 is closed by a conical plug 74, which is drawn up against the end of the frusto-conical body 22 when the housing is under vacuum but prevented from falling to the bottom of the housing by three chains 76 when vacuum is removed.

A propeller 78 may be mounted in the housing above the concentric frusto-conical blades for assisting in separating water and snow from the dust. The propeller is provided with blades 80 which rotate by themselves when the vacuum pump 34 is in operation. The blades of the propeller deflect the water and snow without affecting the dust which moves up to the filter.

A vibrator 82 is mounted on a supporting structure 84 secured to the flange 44 of the main body of the housing. The vibrator is supplied with air through inlet port 86 and such air exits through port 88. The vibrator is provided for shaking the dust off the filter and collecting it into a bag 90, which is removably attached to a cylindrical extension 92, welded to frusto-conical body 22 of the housing.

The above-disclosed apparatus operates as follows:

When the operator starts the rock drilling equipment, he also operates a valve (not shown) which lets compressed air flow through the venturi pump 34 of the vacuum cleaner. This produces sufficient vacuum in the housing to suck up dust from the rock drilling equipment into the filter assembly, while water and snow are retained by the water-collecting frusto-conical tubes 66 and 68. When the operator stops the rock drilling equipment to add a new drill after having driven the previous one into the ground, he also stops the venturi pump. When the vacuum is removed from the housing, the conical plug 74 drops, thus opening the lower end of the frusto-conical body 22. The operator then closes another valve (not shown) to operate the vibrator 82. The latter vibrates the filter assembly and causes the dust to fall on the conical plug 74, which is now open, and into the bag 90 at the base of the filter. During that time, a new drill is installed and the rock drilling equipment is re-started. The pump is also re-started at the same time for another cycle. After having repeated the cycle two or three times, the bag is filled and it may be replaced while the drilling equipment is in operation without any loss of production time.

Although the invention has been disclosed for use in conjunction with a rock drilling equipment, it is to be understood that it may be used for collecting dust from any dust-generating machines, such as in asbestos fiber transformation, tire reconditioning, etc.

The above-disclosed industrial vacuum cleaner has been tested experimentally for more than two hundred hours at the James Bay Project, in all kinds of weather conditions, and has provided an outstanding performance. It is light as compared to the known dust-collecting apparatus due to compactness of the filter. As a matter of fact, it is so light that it may be attached to the mast of the rock drilling equipment. It requires very little power for operation and is not sensible to water and snow, so that the filter is always dry.

Although the invention has been disclosed with reference to a preferred embodiment of the invention, it is to be understood that other alternatives are also envisaged and that the invention is to be limited by the scope of the claims only.

What I claim is:

1. An industrial vacuum cleaner comprising a housing including a main cylindrical body and an upper and a lower frusto-conical body secured one to each end of the main body, support means to support said housing in an upright position, means located in said upper frusto-conical body to suck air upwardly through said housing and discharge the same through an upper opening of said upper frusto-conical body, said lower frusto-conical body having an inlet port in the side wall thereof for admitting dust-laden air into said housing, and having a bottom opening, plug means removably closing said bottom opening, filter means located in said cylindrical body between said inlet port and said means to suck air, and pre-separator means for preventing water which might be present in the dust-laden air from attaining the filter means, said pre-separator means including an outer and an inner frusto-conical tube fixedly mounted within said lower frusto-conical body in spaced relationship one with the other and with said lower frusto-conical body, annular partition wall means located at the connection of said cylindrical body with the lower frusto-conical body and separating the inside of said cylindrical body from the spaces between said lower frusto-conical body and said outer and inner frusto-conical tubes, said inner frusto-conical tube being in full communication with the inside of said cylindrical body, said outer frusto-conical tube having an inlet opening diametrically opposite said inlet port and being otherwise imperforate, said inner frusto-conical tube having a plurality of baffled openings diametrically opposite said inlet opening, said two frusto-conical tubes each having a bottom opening registering with each other and with the bottom opening of said lower frusto-conical body.

2. An industrial vacuum cleaner as defined in claim 1, wherein said plug means removably closes the bottom opening of said outer frusto-conical tube as well as the bottom opening of said lower frusto-conical body.

3. An industrial vacuum cleaner as defined in claim 2, wherein said bottom opening of said lower frusto-conical body has a larger diameter than the bottom opening of said outer frusto-conical tube and wherein said plug means is a conical plug freely suspended from the lower end of said lower frusto-conical body in spaced register with said bottom openings and moving up to contact the edges of the bottom openings of both said lower frusto-conical body and said outer frusto-conical tube under the vacuum created in said housing during operation of said vacuum cleaner, and further including means for attaching a dust-collecting bag to the lower end of said housing in register with the bottom opening of said lower frusto-conical body, and a vibrator mounted on said filter means for causing the dust collected in said filter means to fall through the registering bottom openings of said inner and outer frusto-conical tubes and of said lower frusto-conical body and into the dust-collecting bag when the vibrator is operated.

4. An industrial vacuum cleaner as defined in claim 1, 2 or 3, further comprising an axial flow propeller mounted for free rotation in the communication between said inner frusto-conical tube and said cylindrical body for further preventing water which might be present in the dust-laden air from attaining the filter means.

* * * * *